US009593039B2

(12) United States Patent
Chenu et al.

(10) Patent No.: US 9,593,039 B2
(45) Date of Patent: Mar. 14, 2017

(54) NANOSTRUCTURED GLASSES AND VITROCERAMICS THAT ARE TRANSPARENT IN VISIBLE AND INFRA-RED RANGES

(71) Applicant: CENTRE NATIONAL DE LA RECHERCHE SCIENTIFIQUE (CNRS), Paris (FR)

(72) Inventors: Sébastien Chenu, Olivet (FR); Mathieu Allix, Olivet (FR); Guy Matzen, Saint Denis en Val (FR); Emmanuel Veron, Saint Jean le Blanc (FR); Thierry Cardinal, Salles (FR)

(73) Assignee: CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 14/771,127

(22) PCT Filed: Feb. 28, 2014

(86) PCT No.: PCT/EP2014/053932
§ 371 (c)(1),
(2) Date: Aug. 27, 2015

(87) PCT Pub. No.: WO2014/131881
PCT Pub. Date: Sep. 4, 2014

(65) Prior Publication Data
US 2016/0046520 A1    Feb. 18, 2016

(30) Foreign Application Priority Data

Feb. 28, 2013    (FR) ...................................... 13 51795

(51) Int. Cl.
*C03C 10/00*    (2006.01)
*C03C 3/064*    (2006.01)
(Continued)

(52) U.S. Cl.
CPC .......... *C03C 10/0009* (2013.01); *C03B 32/02* (2013.01); *C03C 3/062* (2013.01);
(Continued)

(58) Field of Classification Search
CPC .................................................. C03C 2201/31
See application file for complete search history.

(56) References Cited

U.S. PATENT DOCUMENTS 5,786,287 A    7/1998    Bayya et al.
6,287,993 B1 *  9/2001    Fu .......................... C03C 3/078
                                             252/301.4 F
(Continued)

FOREIGN PATENT DOCUMENTS

CN        1587142 A        3/2005
WO    WO 01/28943 A1       4/2001
WO    WO 2008/075546 A1    6/2008

OTHER PUBLICATIONS

De Pablos-Martín et al., "Nanocrystallisation in oxyfluoride systems: mechanisms of crystallisation and photonic properties," International Materials Reviews, vol. 57, No. 3, 2012, pp. 165-186 (Jun. 30, 2011, pp. 1-21) (23 pages total provided).
(Continued)

*Primary Examiner* — Noah Wiese
(74) *Attorney, Agent, or Firm* — Birch, Stewart, Kolasch & Birch, LLP

(57) ABSTRACT

The present invention relates to novel vitroceramic or lens compositions that are nanostructured and transparent or translucent, including at least 97%, such as 97% to 100%, preferably 99% to 100%, by weight, relative to the total weight of the material, of a composition having the following formula I: $(GeO_2)_x(SiO_2)_y(B_2O_3)_z(Ga_2O_3)_a(Oxy_1)_b(Oxy_2)_k$ (I) where $Oxy_1$ is an oxide selected from ZnO, MgO, $NbO_{2.5}$, $WO_3$, NiO, SnO, $TiO_2$, $BiO_{1.5}$, AgO, CaO, MnO, or a mixture thereof, selected preferably from ZnO,
(Continued)

Figure 1:
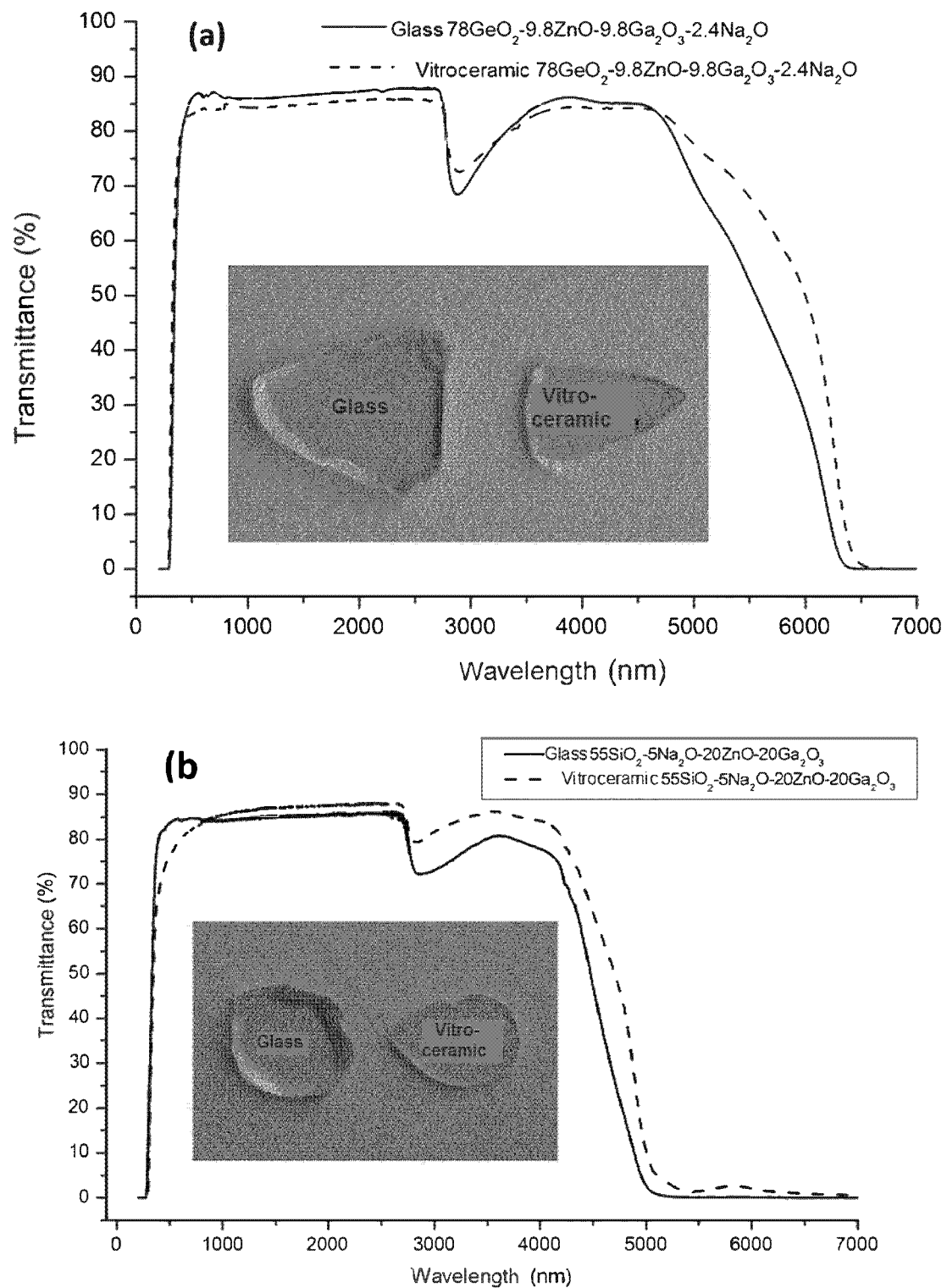

MgO, $NbO_{2.5}$, $WO_3$, NiO, SnO, AgO, CaO, MnO, or a mixture thereof, selected more preferably from ZnO, MgO, AgO, $BiO_{1.5}$, $NbO_{2.5}$, Or a mixture thereof, selected most preferably from ZnO, MgO, AgO, $NbO_{2.5}$, or a mixture thereof, and $Oxy_2$ is an oxide selected from $Na_2O$, $K_2O$ or a mixture thereof, $Oxy_2$ is preferably $Na_2O$, and x, y, z, a, b and k are as defined in claim 1, to the manufacturing method thereof and to the uses thereof in the field of optics.

35 Claims, 5 Drawing Sheets

(51) Int. Cl.
    *C03C 3/089*     (2006.01)
    *C03C 3/253*     (2006.01)
    *C03C 4/10*     (2006.01)
    *C03B 32/02*     (2006.01)
    *C03C 3/062*     (2006.01)
    *C03C 3/066*     (2006.01)
    *C03C 3/078*     (2006.01)
    *C03C 3/097*     (2006.01)

(52) U.S. Cl.
    CPC .............. *C03C 3/064* (2013.01); *C03C 3/066* (2013.01); *C03C 3/078* (2013.01); *C03C 3/089* (2013.01); *C03C 3/097* (2013.01); *C03C 3/253* (2013.01); *C03C 4/10* (2013.01); *C03C 10/00* (2013.01)

(56) References Cited

U.S. PATENT DOCUMENTS

| | | | |
|---|---|---|---|
| 6,936,555 B2* | 8/2005 | Pinckney | C03C 10/0036 385/141 |
| 2003/0133593 A1 | 7/2003 | Tullberg et al. | |
| 2005/0159289 A1 | 7/2005 | Bayya et al. | |
| 2006/0142413 A1* | 6/2006 | Zimmer | C03C 3/089 523/122 |

OTHER PUBLICATIONS

Duan et al., "Synthesis and photoluminescence of $Eu^{3+}$ -doped $ZnO$—$Ga_2O_3$—$SiO_2$ nano-glass-ceramics," Journal of Non-Crystalline Solids, vol. 354, 2008 (available online Aug. 21, 2008), pp. 4695-4697.

Duan et al., "Transparent cobalt doped MgO—$Ga_2O_3$—$SiO_2$ nano-glass-ceramic composites," Applied Physics Letters, vol. 89, 2006 (published online Nov. 3, 2006), pp. 183119-1 to 183119-3(4 pages total).

French Preliminary Search Report, dated Nov. 15, 2013, for French Application No. 1351795.

International Search Report (Form PCT/ISA/210), dated Apr. 9, 2014, for International Application No. PCT/EP2014/053932.

Krell et al., "Transparent compact ceramics: Inherent physical issues," Optical Materials, vol. 31, No. 8, 2009 (available online Feb. 12, 2009), pp. 1144-1150.

Le Masne De Chermont et al., "Nanoprobes with near-infrared persistent luminescence for in vivo imaging," Proceedings of the National Academy of Sciences, vol. 104, No. 22, May 29, 2007, pp. 9266-9271.

Lipinska-Kalita et al., "Spectroscopic properties of $Cr^{3+}$ ions in nanocrystalline glass-ceramic composites," Journal of Non-Crystalline Solids, vol. 352, No. 6-7, 2006 (available online Feb. 20, 2006), pp. 524-527.

Murthy et al., "Properties and structure of glasses in the system $M_2O$—$Ga_2O_3$-$GeO_2$ (M=Li, Na, K)," Physics and Chemistry of Glasses, vol. 8, No. 1, Feb. 1967, pp. 26-29.

Sen et al., "Optical properties of bismuth germanate glasses containing zinc oxide," Journal of Materials Science Letters, vol. 5, No. 6, Jun. 1986, pp. 617-619.

Sigaev et al., "Nickel-assisted growth and selective doping of spinel-like gallium oxide nanocrystals in germano-silicate glasses for infrared broadband light emission," Nanotechnology, vol. 23, No. 1, 2012 (published Dec. 8, 2011), 015708, pp. 1-7.

Yu et al., "Photoluminescent properties of $Dy^{3+}$ in MgO—$Ga_2O_3$—$SiO_2$ nano-glass-ceramic prepared by sol-gel method," Physica B, vol. 406, 2011 (available online May 11, 2011), pp. 3101-3103.

Yu et al., "The photoluminescent properties of $Eu^{3+}$ in MgO—$Ga_2O_3$—$SiO_2$ nanocrystalline glass-ceramic," Journal of Physics and Chemistry of Solids, vol. 71, 2010, pp. 1656-1659.

Zhang et al., "A new class of infrared transmitting glass-ceramics based on controlled nucleation and growth of alkali halide in a sulphide based glass matrix," Journal of Non-Crystalline Solids, vol. 337, 2004 (available online May 14, 2004), pp. 130-135.

Zhou et al., "Ligand-Driven Wavelength-Tunable and Ultra-Broadband Infrared Luminescence in Single-Ion-Doped Transparent Hybrid Materials," Advanced Functional Materials, vol. 19, 2009, pp. 2081-2088.

* cited by examiner

NANOSTRUCTURED GLASSES AND VITROCERAMICS THAT ARE TRANSPARENT IN VISIBLE AND INFRA-RED RANGES

This invention relates to novel vitroceramic or glass compositions that are nanostructured, transparent or translucent, their methods of manufacture, and their uses.

Optical applications require the use of vitroceramics or glasses that transparent, or at very least translucent. The wavelengths of interest are those of the visible light spectrum, i.e. within the range between 400 nm and 800 nm, and within the infra-red range between 800 nm and 8000 nm.

Compositions of transparent or translucent nanostructured materials have previously been described. However, these refer essentially to polycrystalline ceramics produced from nanometric and vitroceramic precursors.

The methods of manufacture for polycrystalline ceramics generally apply precursors in the form of nanometric particles, which are relatively expensive owing to their complex synthesis, as is shown in the work of Krell et al. (Transparent compact ceramics: Inherent physical issues. *Optical materials* 2009, 31 (8), 1144-1150). The particles undergo a stage of pressing, followed by a stage of sintering (fritting), at a temperature often greater than 1500° C., and typically at high pressure. The growth of crystals takes place during this sintering stage. Moreover, it should be noted that the precursors of such ceramics present a real health hazard.

Such transparent polycrystalline ceramics, produced from nanometric precursors, are extremely well suited for high-performance applications in optics, but entail inordinately high production costs for the most common applications, for example displays, lighting or medical imaging procedures.

There is therefore a need for new transparent or translucent glasses and vitroceramics, in both the visible and infra-red ranges up to 8 µm (wavelength within the range between 400 nm and 8 µm), which will combine the ability to adjust their optical properties with a relatively inexpensive procedure of manufacture, for example of the glass-making type.

Transparent or translucent vitroceramics that are based on germanates and/or silicates, obtained using a glass-making procedure, but which contain fluorine (fluorides and oxyfluorides) or chalcogens (including sulphides), have previously been described in the literature, for example in papers by De Pablos-Martin et al (2012), International Materials Reviews 57(3): 165-186, and Zhang et al, Journal of Non-Crystalline Solids, 2004, 337, 130-135. These show high transparency in both the visible and the infra-red, but have low chemical stability. Moreover, fluorine, which is extremely volatile at high temperatures, is highly corrosive and toxic, thus requiring the use of expensive secure industrial plant.

Transparent or translucent vitroceramics based on germanates and/or silicates, obtained using a glass-making procedure, but which contain barium oxide (BaO; see US 2005/0159289), aluminates ($Al_2O_3$; see US 2003/00133593 and WO 01/28943), lithium oxide (Sigaev et al, Nanotechnology 23 (2012) 01708 7 pp) or have a high sodium oxide content (molar level greater than 8% in $Na_2O$; see Zhou et al, *Adv. Funct. Mater.* 2009, 19, 2081-2088) have also been described.

Bayya et al (U.S. Pat. No. 5,786,287) have reported vitroceramics that are high in $Y_2O_3$, $La_2O_3$ or $Gd_2O_3$. Thus, in these vitroceramics, $Y_2O_3$, $La_2O_3$ or $Gd_2O_3$ cannot be construed as simple dopants. It should be specially noted that vitroceramics produced according to Bayya et al are transparent only in the infra-red range (wavelength in the range between 2 µm and 5 µm), but not in the visible, and show very high crystallisation rates (greater than 80% by volume). Moreover, the glasses described do not display nanostructuring.

Furthermore, Duan et al (*Applied Physics Letters* 2006, 89, 183119, also *Journal of Non-Crystalline Solids* 2008, 354, 4695-4697) and Yu et al (*Journal of Physics and Chemistry of Solids* 2010, 71, 1656-1659, also *Physica B* 2011, 406, 3101-3103) describe nanocrystalline vitroceramics that are high in $SiO_2$. Such vitroceramics are obtained through thermal treatment from a solid obtained using the sol-gel method, therefore such vitroceramics are not obtained by means of a glass-making procedure, since the intermediate solid is not a glass, but rather a desiccated gel. Moreover, such vitroceramic compositions contain 89% and 90% molar $SiO_2$. Materials developed using Duan et al's and Yu et al's procedure correspond to only a restricted range of vitroceramics, and hence also of optical properties. We might also mention vitroceramics that are high in $SiO_2$ (i.e. content greater than 60%) by Lipinska-Kalita et al (J. Non-Crystalline Solids 352 (2006) 524-527).

Murthy et al (Physics and Chemistry of Glasses, Vol. 8, no. 1, February 1967) report ternary glasses with the formula $M_2O$—$Ga_2O_3$—$GeO_2$, in which M. is an alkaline metal, selected from Li, Na or K. In this paper, the authors conducted a study intended to define ranges of vitrifiable composition. Outside those ranges the ternary mixture will crystallise at least in part, thereby resulting in the appearance of crystals here and there. However, we should note that the size of the crystals was not reported, other than the concentration of weight in the vitreous matrix.

International application WO2008/075546 dealt with glasses for sensors, where these glasses had transmittance levels of at least 50% at a wavelength of 5.5 µm, and no greater than 10% at a wavelength of 7.0 µm. Glasses produced according to WO2008/075546 therefore act as filters at certain wavelengths. Glasses produced according to WO2008/075546 include, in moles: from 10% to 50% $Bi_2O_3$; from 20% to 85% $GeO_2$; from 0% to 19% $Ga_2O_3$; and 0% to 15% $Al_2O_3$.

Chinese patent application CN1587142 was concerned with glasses of the germanate type, doped with bismuth of a molar composition including: 90% to 99.98% $GeO_2$; 0.01% to 5 mol % $Bi_2O_3$; and 0.01% to 9 mol % M, with M being selected from among $Al_2O_3$, $Ta_2O_5$, $Ga_2O_3$ and $B_2O_3$. Glasses obtained according to CN1587142 are coloured (from fleshy-pink to violet-red or brownish-red) owing to their high $Bi_2O_3$ content. They are also fluorescent.

However, neither the paper by Murthy et al, nor the WO2008/075546 or CN1587142 applications reports nanostructured glasses comparable to the glasses of this invention, in which we obtain nanostructuring by segregating out galates (phases that are rich in gallium). Moreover, as already emphasised, those papers are in any case not concerned with vitroceramics. In particular, Murthy et al do not report any vitroceramic since the glass containing crystals has not undergone subsequent thermal treatment, which would indeed facilitate enhancement of the material's physical and thermal properties. Moreover, Murthy et al do not report a nanostructured vitroceramic.

In contrast to the materials of the prior art, this applicant discovered, much to their own surprise, new nanostructured and transparent (or at least translucent) glasses and vitroceramics based on gallium and silica and/or germanate.

Vitroceramics, as well as the glasses of this invention, are nanostructured. Nanostructuring of vitroceramics corresponds to the presence of crystals of nanometric sizes in the vitreous matrix. Nanostructuring of glasses comes about from a segregation or separation of phase. Thus, images of electronic microscopies in transmission reveal the appearance of domains of nanometric size (phase 1), which are included in a matrix (phase 2). Depending on the composition of the glass, phase separation is of the nucleation-growth or spinel type. In the case of a nucleation-growth phase, the nanodomains have a spherical shape, whereas in the case of a separation of the spinel type, the nanodomains are intertwined within the matrix.

Domains of nanometric size (vitreous in the case of nanostructured glasses, or equivalent to nanocrystals in the case of vitroceramics) are homogenous in both composition and size, and their distribution is uniform within the vitreous matrix.

The size, shape and proportions of nanostructured domains of glasses and nanometric crystals of vitroceramics can be controlled through the nominal composition, also to a lesser extent by the glass-making procedure.

These domains of nanometric size are obtained through the segregation of a phase that is high in gallium, this element being then concentrated in these nanometric domains. On the other hand, the residual concentration of gallium in the vitreous matrix is very low. It is by controlling the segregation of galates that we maintain control over nanostucturation (i.e. the dimensions and shapes of nanodomains) of glasses and vitroceramics, and hence also their transparency.

Moreover, vitroceramics can readily be obtained under this invention by means of an inexpensive glass-making procedure.

In contrast to prior art, it should also be noted that, under this invention, glasses and vitroceramics show no detectable content of BaO, aluminate ($Al_2O_3$), or of lithium oxide ($Li_2O$), and a molar content less than or equal to 7% in $Na_2O$. Moreover, compositions under this invention contain neither fluorides nor chalcogens. In addition, under this invention, they may contain dopants, in particular of rare earth and transition elements with a molar content less than 3% of the composition, preferably less than 1%. The introduction of those elements in excessive amounts will indeed result in the loss of the transparency properties of vitroceramics according to the invention.

For the purposes of this invention, the term "glass" means an amorphous inorganic solid that displays the phenomenon of vitreous transition. A glass is obtained by cooling from a liquid phase. Thus, it is not obtained in powder form. Hence, glass under this invention is not obtained using a sol-gel procedure.

For the purposes of this invention, by the term "vitroceramic" we mean an inorganic material comprising a vitreous matrix (i.e. an amorphous phase) and crystals, preferably of nanometric size, with a controllable crystallisation level within the range 2% to 75%. In other words, between 2% and 75% of the material is crystalline by volume. The vitroceramic's crystallisation rate should preferably be between 10% and 60%. Thus, the crystals are encased within the matrix of glass. This material is not obtained in powder form.

For the purposes of this invention, by the term "nanometric size" we mean a size within the range of 1 nm and 500 nm, and preferably between 5 nm and 150 nm.

For the purposes of this invention, by the term "transparent" we mean one can see through the material. Where applicable, this qualitative notion of transparency is specified in quantitative terms using a measure of specular light transmission. The protocol for measuring specular light transmission entails measuring the intensity of light according to the incident rays of light. A material may be considered as being transparent (in particular for optical applications) for a given wavelength when its specular light transmission is greater than or equal to 30%.

For the purposes of this invention, by the term "translucent" we mean that light will pass through the material, but it is not possible to see through the material distinctly. Where applicable, this notion of translucence is specified by a measure of total light transmission. The protocol for measuring total transmission entails measuring the intensity of light (i.e. specular and diffused) according to a solid 180° angle at a given wavelength.

It is understood that, in this context, the notions of transparency and translucency extend to the thickness of the material. Typically, the samples from which measurements are taken will have a thickness within a range between 1 nm and 10 nm.

In this description, the terms "material" or "materials" refer to the transparent or translucent nanostructured glasses and vitroceramics of this invention.

For the purposes of this invention, "segregation" means that a homogenous phase is broken down into differing composition domains. There are two types of segregation, namely: —Segregation of the "nucleation-growth" type, which produces spherical domains within the matrix, as shown for example in FIG. 2.

Figure 3:
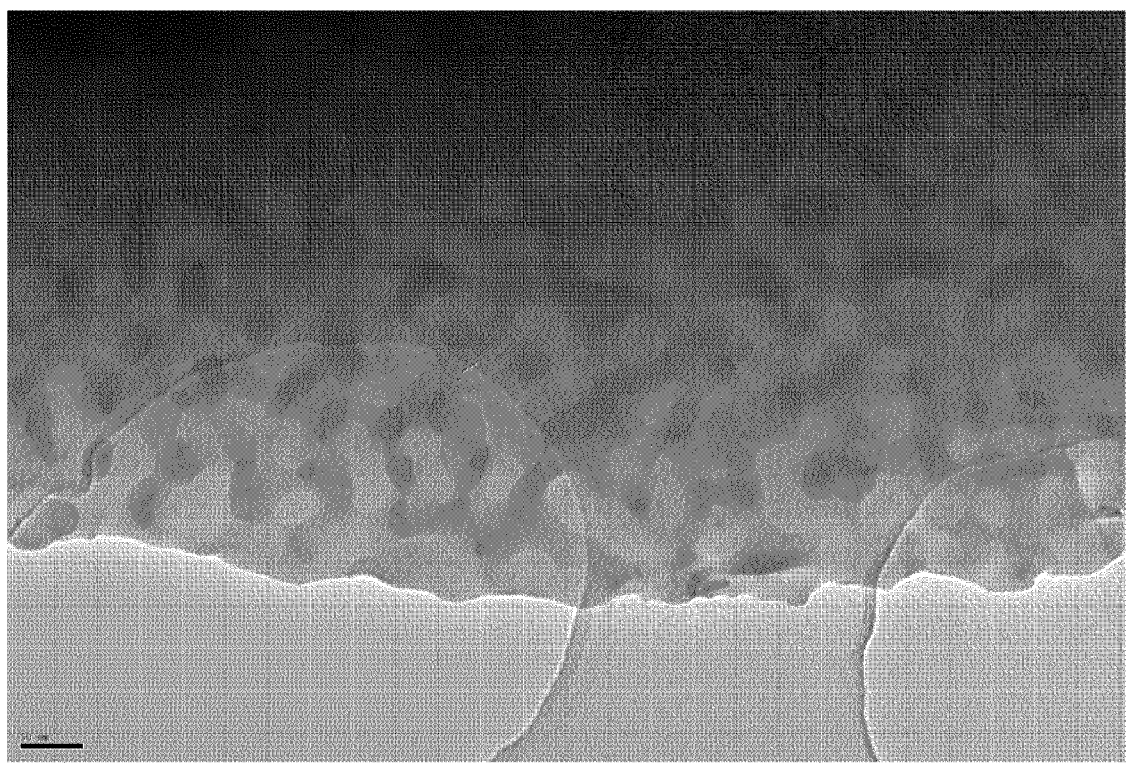

Segregation of the "spinel" type, which produces intertwined domains, as shown for example in FIG. 3.

Materials under this invention are "nanostructured", meaning they present a texture on a nanometric scale.

For the purposes of this invention, "nanostructuring" means that glasses and vitroceramics comprise composition domains of nanometric sizes, typically obtained through segregation. Those domains are characterised by having a distinct composition. In the case of glasses, the nanodomains (domains of nanometric sizes) are vitreous. In the case of vitroceramics, nanodomains correspond to crystals of nanometric size.

For the purposes of this invention, "glass-making process" means a procedure enabling one to obtain a glass or vitroceramic from raw materials in the form of powders, thus powders being not nanometric precursors. A procedure of this type comprises a step of melting of raw materials in the form of powders, producing a high-temperature liquid, followed by a step of cooling that liquid, producing the glass. A glass-making vitroceramic manufacturing process also comprises a step of thermal crystallisation treatment.

For the purposes of this invention, "thermal crystallisation treatment" means heating of the glass, allowing the controlled crystallisation thereof.

For the purposes of this invention, "composition that shows an essentially zero content for a constituent" means that the composition contains, for example, less than 0.1% by weight, and preferably less than 0.01% by weight of that constituent, in relation to the overall weight of that composition. Specifically, a composition that presents essentially zero content of a given constituent may still include trace amounts of that constituent, but should preferably not contain it at all.

In the description of this invention, variables a, b, k, x, y and z (referring to the standard composition of formula 1) refer to molar proportions. Throughout this document, moreover, unless otherwise indicated percentages are per-unit-mass percentages, and are expressed in relation to the total weight of the element in question. For example, when it is stated that a composition or mixture contains 3% of a given compound, it is understood that this composition or mixture contains 3% by weight of that compound in relation to the overall weight of that composition or mixture. Moreover, it is understood that when in this invention it is stated that one of the variables falls within the range of two values, the limits indicated are included within that range of values. Thus, when we say "z falls within the range 0 to 10", it is understood that z is between 0 and 10, including both 0 and 10.

One purpose of this invention therefore concerns transparent or translucent nanostructured glasses based on silica and/or germanium oxides, and gallium oxide.

A further purpose of this invention concerns transparent or translucent nanostructured vitroceramics based on silica and/or germanium oxides, and gallium oxide.

A further purpose of this invention concerns a process for the manufacture of transparent or translucent nanostructured glasses based on silica and/or germanium oxides, and gallium oxide, comprising a step of separation (segregation).

A further purpose of this invention concerns a manufacturing process of transparent or translucent nanostructured vitroceramics based on silica and/or germanium oxides, and gallium oxide, comprising a step of thermal crystallisation treatment of a glass with the corresponding composition.

A further purpose of this invention concerns the use of transparent or translucent nanostructured vitroceramics based on silica and/or germanium oxides, and gallium oxide, for the manufacture of optical materials, and specifically of the luminescent type (i.e. fluorescent, phosphorescent).

A further purpose of this invention concerns the use of transparent or translucent nanostructured glasses based on silica and/or germanium oxides, and gallium oxide, for the manufacture of lighting or display material.

Glasses and Vitroceramics

The vitroceramic or glass according to this invention, which is nanostructured and transparent or translucent, contains at least 97%, i.e. from 97% to 100%, and preferably from 99% to 100% by weight, in relation to the overall weight of the material, of a composition of the following formula I:

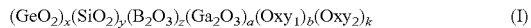

$$(GeO_2)_x(SiO_2)_y(B_2O_3)_z(Ga_2O_3)_a(Oxy_1)_b(Oxy_2)_k \qquad (I)$$

where $Oxy_1$ is an oxide selected from ZnO, MgO, $NbO_{2.5}$, $WO_3$, NiO, SnO, $TiO_2$, $BiO_{1.5}$, AgO, CaO, MnO or a mixture thereof, selected preferably from ZnO, MgO, $NbO_{2.5}$, $WO_3$, NiO, SnO, AgO, CaO, MnO, or a mixture thereof, selected more preferably from ZnO, MgO, AgO, $BiO_{1.5}$, or a mixture thereof, selected most preferably from ZnO, MgO, AgO, or a mixture thereof, and $Oxy_2$ represents an oxide selected from $Na_2O$, $K_2O$ or a mixture thereof, $Oxy_2$ is preferably $Na_2O$, and x is within the range between 0 and 98, and y is within the range between 0 and 60, and x and y are not simultaneously zero, and z is within the range between 0 and 20, preferably between 0 and 10, x+y+z is within the range between 40 and 98, a is within the range between 0.1 and 50, preferably between 0.5 and 25, b is within the range between 0 and 35, preferably between 1 and 35, and k is within the range between 0 and 7, preferably between 0 and 5, and x, y, z, a, b and k are such that x+y+z+a+b+k=100.

In formula (I) above, the oxides of germanium, silicon and boron are glass-forming oxides.

The vitroceramic or glass according to the invention should preferably be characterised in that x and y are such that x+y≥40, and preferably x+y≥50.

In one particular embodiment, z is equal to 0.

As previously mentioned, both vitroceramics and glasses under this invention are nanostructured. The nanostructuring of vitroceramics corresponds to the presence of crystals of nanometric size within the vitreous matrix. Nanostructuring of glasses corresponds to a segregation (separation) of phase. In the materials under this invention, nanometric size domains (in the case of glasses), or nanocrystals (in the case of vitroceramics) are homogenous in both composition and size, and their distribution is uniform within the vitreous matrix.

The shape and size of nanodomains or nanocrystals is adjustable depending on the nominal composition, and to a lesser extent on the manufacturing process of glasses. It is the nanometric size of that structure that imparts transparency to both glasses and vitroceramics under this invention.

Without wishing to be impeded by theory, it would appear that these nanodomains are obtained through the segregation of a phase high in gallium, since this element is concentrated in those nanometric domains. On the other hand, the residual concentration of gallium in the vitreous matrix is very low. Gallium is associated with another oxide ($Oxy_1$) during its segregation, thereby forming a phase that is high in gallium and $Oxy_1$, which might well be noted $(Ga_2O_3)(Oxy_1)$. In glasses that contain zinc oxide, for example, we can segregate a vitreous phase of zinc galate $(Ga_2O_3)(ZnO)$, which will then crystallise when developing a vitroceramic made of nanocrystals of $ZnGa_2O_4$.

Thus, both gallium oxide and $Oxy_1$ form essential constituents of the "galate" nanodomain or phase of materials under this invention.

Advantageously, a is within the range between 1 and 50, preferably between 1 and 25.

Advantageously, b is within the range between 1 and 25, preferably between 2 and 25.

In any specific embodiment, a lies within the range between 1 and 50 (preferably between 1 and 25), while b lies within the range between 1 and 35, more preferably between 1 and 25, and most preferably between 2 and 25.

In the materials according to this invention, the presence of barium oxide or aluminium oxide will completely inhibit the nanostructuring of materials. Hence, in contrast to previous work, the materials used in this invention have an essentially zero BaO and $Al_2O_3$ content.

Moreover, materials according to this invention have an essentially zero $Li_2O$ content.

The addition of alkaline oxide ($Oxy_2$) is particularly useful if we wish to reduce the size of segregated domains (nanodomains of the glass under this invention). However, the amount introduced must be less than 7% molar (c is less than or equal to 7) in order to prevent loss of nanostructuring.

In one particular embodiment, k lies within the range between 1 and 7, and preferably between 1 and 5.

In another embodiment, a lies within the range between 1 and 50 (preferably between 1 and 25); b lies within the range 1 and 35, more preferably between 1 and 25, and most preferably between 2 and 25, while k lies within the range between 1 and 7, and preferably between 1 and 5.

In one particular embodiment, the material of the invention comprises 100% weight of a composition of formula I as defined above.

In an embodiment, the material of this invention comprises in addition to the composition of formula (I), other additives in normal use in glass-making and/or optic methods. These standard additives are well known to those skilled in the art.

For the purposes of this invention, "in addition" means a quantity of additive elements sufficient to attain 100% per unit weight for the material in question. Accordingly, the material of this invention may include up to 3% (from 0% to 3%), or up to 1% (from 0% to 1%) by weight of standard additive elements, in relation to the overall weight of that material.

By way of example, we might cite normal additives such as carbon or sodium sulphate, which are used to enhance refining on an industrial scale.

Dopants are typically used to create variation in the optical properties of glasses and vitro-ceramics. For example, it is known that doping with elements belonging to the group of rare transition elements or earths makes it possible to select the spectral emission range. The dopant element, its concentration and degree of oxidisation, are selected according to the composition of the host matrix and optical properties being sought for that material. Dopants can be selected from among transition elements (for example, Cr, Mn, Fe, Co, Ni, Ti, W, etc.). They may also be selected from among rare earths, preferably the lanthanides. Better still, dopants may be selected from among scandium, yttrium, lanthane, cerium, praseodymium, neodymium, samarium, europium, gadolinium, terbium, dysprosium, holmium, erbium, thulium, ytterbium, lutecium and mixtures thereof. Europium, cerium, erbium, nickel and manganese are to be preferred, while those skilled in the art may see fit to produce a co-dopant, using multiple rare earths and/or transition elements, depending on the desired optical properties.

When these are present, dopants may form up to 3% per unit mass, but preferably up to 1% per unit mass, of the overall composition of the material. Thus, the material will typically include less than 3% by weight, or less than 1% by weight, of dopants.

Materials of this invention are transparent, or at very least translucent. This property is essential to permit of the use of materials of this invention in optics. Refractory materials, cements, mortars, that might otherwise be prepared using the same raw materials as materials of this invention, are not transparent. Moreover, those materials are not obtained using a glass-making procedure.

The vitroceramics of this invention are distinguished from materials that are obtained through sintering by their density: the density of vitroceramics under this invention is in essence their theoretical density (lack of porosity). By theoretical density, we mean density as calculated using crystallographic data (mesh structure and parameters) in the absence of porosity. The use of a glass-making procedure enables us to obtain a material with essentially the theoretical density, which is to say we find as absence of porosity. On the other hand, materials obtained by sintering (including pressing) require complex and expensive treatments in order to reduce any residual porosity that would compromise transparency. For the purposes of this invention, by "absence of porosity", we mean the material's porosity is less than 0.5%. Once porosity becomes too great, (typically greater than 0.5%), the material will lose its transparency.

Thus, the preparation of vitroceramics and glasses according to this invention, using a glass-making procedure combined with the choice of compositions of formula (I), imparts some remarkable properties to the materials used: the high degree of transparency intrinsic to the process (lack of porosity) and the compositions of materials, readily adjustable optical properties according to the composition chosen, the size of nanostructured domains and the presence and choice of dopants, the ability to obtain a variety of shapes and important dimensions by virtue of the process (pouring into a mould), and lastly much lower costs than optical materials of comparable compositions, thanks to an inexpensive process.

Methods of Producing Specific Glasses and Vitroceramics.

Germanates

In one particular embodiment, y is equal to 0. To simplify, compositions under this method of production are recited as germanates.

Advantageously, x therefore lies within the range between 50 and 98, and preferably between 60 and 98.

Preferably, in this embodiment, z is equal to 0.

Advantageously, a lies within the range between 0.75 and 15, and preferably between 1 and 15.

In one particular embodiment, k lies within the range between 1 and 3. In another specific embodiment, k is equal to 0.

For example, glasses and vitroceramics were obtained showing a composition selected from among these formula compositions:

$98GeO_2$-$0.75Ga_2O_3$-$1.25ZnO$.
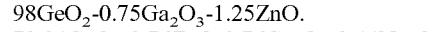
$78.04GeO_2$-$9.76ZnO$-$9.76Ga_2O_3$-$2.44Na_2O$.
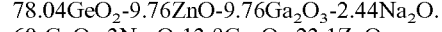
$60\ GeO_2$-$3Na_2O$-$13.9Ga_2O_3$-$23.1ZnO$.
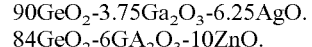
$90GeO_2$-$3.75Ga_2O_3$-$6.25AgO$.
$84GeO_2$-$6GA_2O_3$-$10ZnO$.
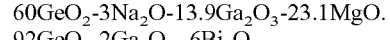
$60GeO_2$-$3Na_2O$-$13.9Ga_2O_3$-$23.1MgO$.
$92GeO_2$-$2Ga_2O_3$-$6Bi_2O_3$.
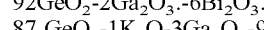
$87\ GeO_2$-$1K_2O$-$3Ga_2O_3$-$9WO_3$.
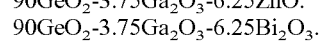
$90GeO_2$-$3.75Ga_2O_3$-$6.25ZnO$.
$90GeO_2$-$3.75Ga_2O_3$-$6.25Bi_2O_3$. and
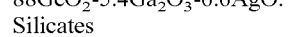
$88GeO_2$-$5.4Ga_2O_3$-$6.6AgO$.

Silicates

In one particular embodiment, x is equal to 0. To simplify, compositions under this method of production are recited as silicates.

Advantageously, y therefore lies within the range between 40 and 60, preferably between 43 and 55.

In addition, advantageously, z lies within the range between 0 and 10, is preferably equal to 0.

Advantageously, a lies within the range between 10 and 30, preferably between 20 and 25.

Preferably b should lie within the range between 10 and 35, most preferably between 14 and 25.

Advantageously, k lies within the range between 3 and 6.

Glasses and vitroceramics were obtained showing a composition selected from among these formula compositions:

$55SiO_2$-$5Na_2O$-$23Ga_2O_3$-$17ZnO$,
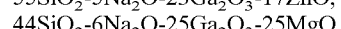
$44SiO_2$-$6Na_2O$-$25Ga_2O_3$-$25MgO$,
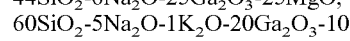
$60SiO_2$-$5Na_2O$-$1K_2O$-$20Ga_2O_3$-$10ZnO$-$4Nb_2O_5$, and
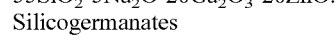
$55SiO_2$-$5Na_2O$-$20Ga_2O_3$-$20ZnO$.

Silicogermanates

In this specific embodiment, x and y are both other than 0. To simplify, compositions under this method of production are recited as silicogermanates.

Advantageously, x and y are each independently within the range between 10 and 80, and preferably between 30 and 70.

Preferably, in this embodiment, x and y are such that x+y should preferably be between 50 and 95, more preferably between 60 and 98, and most preferably between 80 and 95.

In addition, advantageously, z lies within the range between 0 and 10. In one particular embodiment, z is equal to 0. In another particular embodiment, z is equal to 10.

Advantageously, a lies within the range between 0.1 and 10, most preferably between 1 and 5.

Preferably, b should be between 1 and 5, most preferably between 4 and 5.

In one particular embodiment, k lies within the range between 1 and 3. In another particular embodiment, k is equal to 0.

Specifically, glasses and vitroceramics were obtained showing a composition selected from among these formula compositions:

42GeO$_2$-50SiO$_2$-3Ga$_2$O$_3$-5ZnO,
70GeO$_2$-10SiO$_2$-2Na$_2$O-4Ga$_2$O$_3$-4Bi$_2$O$_3$, and
50GeO$_2$-30SiO$_2$-10B$_2$O$_3$-5Ga$_2$O$_3$-5ZnO.

Method of Production for Glasses and Vitroceramics According to the Invention:

This invention also concerns a manufacturing process of a transparent glass according to the invention.

The glass is prepared through fusion of raw materials (initial oxides, or their precursors if applicable) going into its composition to produce a liquid, followed by solidification of that liquid by cooling. Segregation of the glass takes place at the step of liquid formation or cooling. These steps therefore allow the introduction of nanostructuring.

The manufacturing process of a nanostructured glass under this invention comprises the successive steps:

1—melting of initial oxides, or if applicable their precursors, present in powder form, at a temperature within the range between 900° C. and 1700°C, 2—cooling, resulting in a transparent or translucent nanostructured glass containing at least 97%, i.e. 97% to 100%, preferably 99% to 100% by weight, in relation to the overall weight of the glass, of a composition of the following formula I:

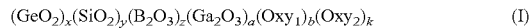

$$(GeO_2)_x(SiO_2)_y(B_2O_3)_z(Ga_2O_3)_a(Oxy_1)_b(Oxy_2)_k \qquad (I)$$

where:

Oxy$_1$ is an oxide selected from among ZnO, MbO, NbO$_{2.5}$, WO$_3$, NiO, SnO, TiO$_2$, BiO$_{1.5}$, AgO, CaO, MnO or a mixture thereof, more preferably selected from among ZnO, MgO, NbO$_{2.5}$, WO$_3$, NiO, SnO, AgO, CaO, MnO or a mixture thereof, or even more preferably selected from among ZnO, MgO, AgO, BiO$_{1.5}$, NbO$_{2.5}$ or a mixture thereof, but most preferably of all selected from ZnO, MgO, AgO, NbO$_{2.5}$ or a mixture thereof, and.

Oxy$_2$ is an oxide, selected from among Na$_2$O, K$_2$O or a mixture thereof. Oxy$_2$ is preferably Na$_2$O, and x is within the range between 0 and 98, and
y is within the range between 0 and 60, and
x and y are not simultaneously zero, and
z is within the range between 0 and 20, preferably between 0 and 10,
x+y+z+ is within the range between 40 and 98,
a is within the range between 0.1 and 50, preferably between 0.5 and 25, and
b is within the range between 0 and 35, preferably between 1 and 35, and
k is within the range between 0 and 7, preferably between 0 and 5, and
x, y, z, a, b and k are such that x+y+z++a+b+k=100.

Therefore, the glass is obtained by melting of initial oxide powders or their precursors, at a temperature within the range 900° C. and 1700° C. It should be noted that the temperatures for developing glasses decrease with increasing germanium oxide content (melting temperature around 1000° C. for x=90, for example).

The initial oxides and any precursors are in the form of normal commercially-available powders (i.e. non-nanometric). Precursors of oxides may be in a form that makes it possible to obtain the initial oxide by thermal treatment, for example in the form of carbonates. For example, a precursor of Na$_2$O might be Na$_2$CO$_3$, while K$_2$CO$_3$ can be used as a precursor of K$_2$O.

Thus, materials under this invention should preferably not contain fluorides, oxyfluorides, nor sulphides—only oxides.

Heating may take place in a conventional oven, heated for example by gas and/or fitted with heating resistors. The melt mixture is then cooled, and if need be poured into a mould.

This process may also include an additional annealing step aiming to release any tension that may be present in the glass.

The glasses according to the invention undergo a segregation, leading to a separation phase, of the nucleation/growth or spinel type, depending on the composition, obtained directly in the glass during synthesis, and in particular at the cooling step. The different nanostructured domains obtained are homogenous in both composition and size, and maintain a uniform distribution inside the vitreous matrix. The size of the various domains thus obtained is adjustable according to composition, and to a lesser extent according to the rate of cooling of the glass, but it will remain nanometric.

It is the nanometric size of this structuring that imparts transparency to both the glasses and vitroceramics under the invention. Light diffusion within a nanostructured glass or vitroceramic is negligible, providing the relationship between the incident wavelength and size of domains is at least equal to 4. For example, nanocrystals of a size less than 100 nm ensure transparency in the visible (i.e. wavelength greater than 400 nm), and at a higher level in the infra-red.

Thus, glasses under the invention can be obtained by:

1—melting of the initial oxides, or if applicable their precursors, present in powder form, at a temperature within the range 900° C. to 1700° C.; and 2—cooling.

This invention also concerns a manufacturing process of a transparent or translucent nanostructured vitroceramic. This process comprises a step of manufacturing a transparent glass as described above, followed by a step of thermal crystallisation treatment of the glass. The glass production stage comprises a step of melting of the initial oxides, or if applicable their precursors, present in powder form, followed by solidification of the mixture cast during cooling. Thermal crystallisation treatment makes it possible to crystallise the nanodomains of that glass, and to convert them into nanocrystals.

The manufacturing process of a vitroceramic according to the invention comprises the successive steps of:

1—Manufacturing a transparent or translucent nanostructured glass according to the invention, following the previously-described process.

2—Thermal crystallisation treatment of that glass at a temperature within the range between 400° C. and 800° C., and more preferably between 600° C. and 800° C., for a period within the range between 15 minutes and 48 hours, more preferably between 15 minutes and 6 hours, most preferably between 30 minutes and 2 hours.

The composition of glasses and vitroceramics may be as previously described for this invention.

It should be noted that the manufacture of vitroceramics under this invention should preferably not involve nucleation stage during the crystallisation treatment. It therefore requires neither thermal crystallisation treatment in two steps, nor the use of nucleation agents. Nucleation catalysts are generally added to the material, even if it already includes an oxide of this type in its composition. The catalyst plays indeed a specific role, different from that of oxides in the composition of the material under this invention.

The manufacturing process of vitroceramics under this invention is therefore both simpler and less expensive than the process described in U.S. Pat. No. 5,786,287.

Moreover, transparent vitroceramics prepared according to the process under this invention can readily be moulded into shape. The glass-making procedure used for their manufacturing process generally allows of producing parts in highly variable shapes, and of substantial dimensions, by pouring into a mould. It is not possible to obtain such a variety of shapes through the techniques for producing monocrystals or transparent polycrystalline ceramics produced by ultra-dense nanometric precursors for optical appliances (obtained by sintering at high pressure and high temperature). The shape of monocrystals is constrained by the synthesis process (i.e. a bar). In the case of transparent polycrystalline ceramics produced from nanometric precursors, the sintering process used requires a pressing stage (at high pressure), which is incompatible with obtaining a variety of shapes (since the traditional shapes obtained under a press are of the cylindrical or cuboid type).

Those skilled in the art will know how to adjust the period of thermal crystallisation treatment so as to obtain transparent or translucent vitroceramics.

The oven used for the stage of thermal crystallisation treatment is preferably a conventional convection oven, and/or fitted with heating resistors.

Thus, vitroceramics under this invention are obtainable through thermal crystallisation treatment of a glass according to invention, at a temperature within the range between 400° C. and 900° C., and preferably between 600° C. and 800° C., for a period within the range between 15 minutes and 48 hours, more preferably between 15 minutes and 6 hours, or between 30 minutes and 2 hours. Preferably, this process will not comprise a nucleation step.

It should be noted that the size of the crystals obtained in the vitroceramic is correlated with the size of the nanodomains (i.e. domains of nanometric size) of the equivalent glass, to a point where the nanocrystals correspond almost perfectly with the vitreous nanodomains. Thus, thermal crystallisation treatment will have very little effect on the nanostructure of the material, and the vitreous matrix will not crystallise noticeably.

Without wishing to be constrained by the interpretation that follows, it has been noted in experiments that the composition of the glass according to the invention, particularly as a function of the parameters x, y and k of the composition formula (I) as previously defined, make it possible to have an effect on the size of nanodomains. The greater the value of x, and/or y, and/or k are, the more the size of the nanodomain will decrease.

Moreover, the rate of cooling of the glass also affects the size of the nanodomains of the glass to a lesser extent: the more the cooling speed is increased, the smaller the nanodomains (domains of nanometric size) will be.

In this way it is possible to control optic properties, and specifically the transparency, of materials under this invention, particularly as a function of parameters x, y and k of the composition of formula (I), as previously defined.

Use of Vitroceramics and Glasses According to the Invention.

Ultimately, this invention concerns the use of a vitroceramic or glass under the invention to manufacture materials for optical purposes, particularly of massive types (for example lenses or filters), powders, fibres (for example optic fibre or laser fibre) or layers.

Glasses and vitroceramics produced under this invention have the properties of transparency in both the visible and infra-red domains, thereby opening up the way to many optical applications (photonic and telecommunications equipment, random laser beams, etc.), especially when glasses and vitroceramics according to this invention include dopants.

In particular, scintillator materials have applications in the field of medical imaging, and in the field of high-energy physics. There are also applications requiring less high performance in the domain of detection (for example, in geology). Luminescent (fluorescent or phosphorescent) materials find applications in the fields of lighting and displays; for example, they can be used in LEDs (light-emitting diodes).

Specifically, vitroceramics whose y is equal to 0 (i.e. germanates) show excellent optical performance, especially in the infra-red. In particular, they show transparent properties at wavelengths within the range between 400 nm and 8 μm. They are therefore eminently well suited for use as a laser or scintillator material, especially when they include dopants, for example Ce, Eu, Pr, Nd, Tm, Dy, Er, Yb, Ho, Ti, Cr, Ni, Bi or mixtures thereof.

As far as vitroceramics whose x is equal to 0 (i.e. silicates) are concerned, these are less expensive, but are transparent only in the visible and near infra-red domain (i.e. wavelength within the range between 400 nm and 3 μm). They are therefore eminently well suited to use as a material for frequency conversions, particularly in the field of lighting, laser beams or scintillators. In the case of use as a scintillator or laser material, vitroceramics under this invention include dopants, including Ce, Eu, Pr, Nd, Yb, Ho, Ti, Cr, Ni or Bi or mixtures thereof.

It should be noted that vitroceramics under this invention have optical and physical properties superior to those of the equivalent glasses.

However, some applications do not call for very high ray resolution, but rather a sufficiently powerful intensity of light. This applies particularly to lighting and displays. Glasses are therefore eminently well suited here.

Thus, depending on the embodiment, glasses and vitroceramics according to the invention may be used to manufacture material for lighting or for displays.

Conversely, in the case of vitroceramics, diffusion can be controlled in order to use the phenomena of diffusion and emission of the material to good effect, making it possible for example to obtain an amplification phenomenon of the random laser-beam type. Vitroceramics under the invention are used to produce random laser-beams.

According to an embodiment, vitroceramics according to the invention are used to manufacture medical material, preferably for medical imaging. An example of such a use was described by Chermont et al, Proc. Natl. Acad. Sci. U.S.A. 2007, 104 (22), 9266-9271.

A specific case concerns the use of a glass according to the invention for laser inscription. A laser scan (run precisely by a control program) can induce an intermittent crystallisation (under the impact of radiation and localised heating produced by the laser). This technique facilitates marking of the glass by contrast between the glass and the vitroceramic points, and a change in its luminescence properties.

DESCRIPTIONS OF THE FIGURES

FIG. 1: Transmittance curves (as %, y-coordinate) according to wavelength (as nm, x-coordinate) of glasses (solid line) and vitroceramics (stippled line) of (a) germanate ($78GeO_2$-$9.8ZnO$-$9.8GaO_3$-$2.4Na_2O$), and (b) silicate ($55SiO_2$-$5Na_2O$-$23Ga_2O_3$-$17ZnO$). Photographs of transparent nanostructured glasses (On the left) and vitroceramics (at right), developed according to the invention, are also shown.

Figure 2:
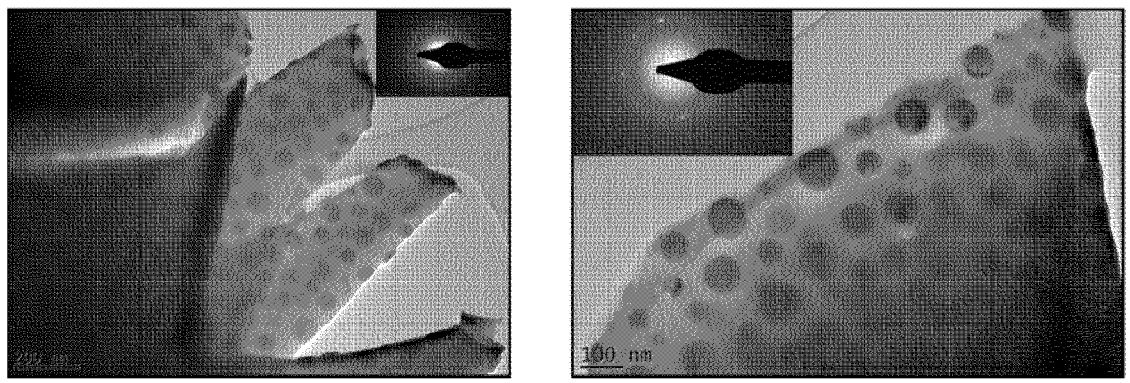

FIG. 2: Negatives of electronic microscopy in transmission (MET) of a glass and vitroceramic of the composition: $84GeO_2$-$6Ga_2O_3$-$10ZnO$ (segregation of the nucleation/growth type). On the left, negative of nanostructured glass; at right, negative of the equivalent vitroceramic, obtained through thermal crystallisation treatment. The negatives of associated electronic diffraction are shown as an inset.

FIG. 3: Negative of electronic microscopy in transmission (MET) of a nanostructured glass (separation of the spinel phase) of the composition $80GeO_2$-$7.5Ga_2O_3$-$12.5ZnO$.

Figure 4:
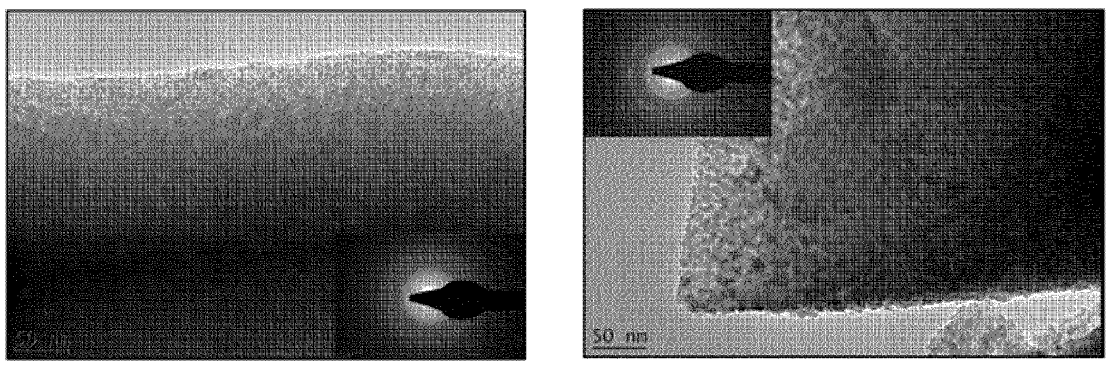

FIG. 4: Negatives of electronic microscopy in transmission (MET) of a glass and a vitroceramic of the composition: $55SiO_2$-$5Na_2O$-$20Ga_2O_3$-$20AnO$. On the left, negative of the nanostructured glass (separation of the spinel phase); at right, negative of equivalent vitroceramic, obtained through thermal crystallisation treatment of the glass.

Figure 5:
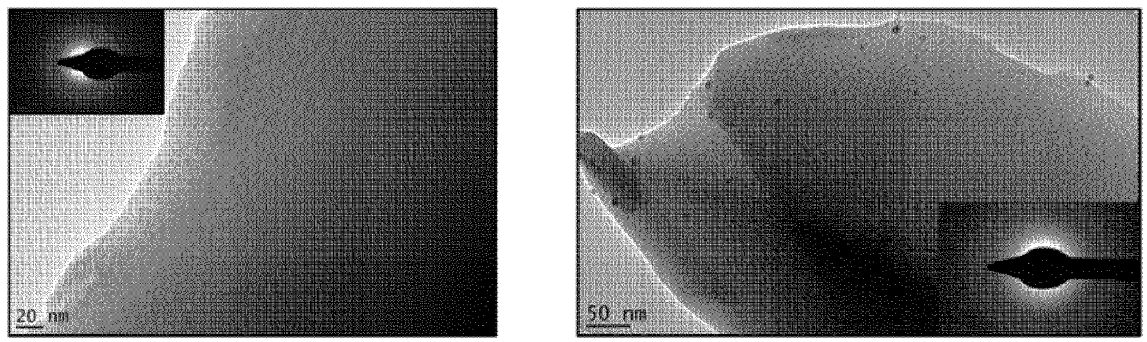

FIG. 5: Negatives of electronic microscopy in transmission (MET) of a glass and of a vitroceramic of the composition: $90GeO_2$-$3.75Ga_2O_3$-$6.25Bi_2O_3$. On the left, negative of the nanostructured glass (separation of nucleation-growth phase with nanostructuring of very small size, in the order of a few nm); at right, negative of the equivalent vitroceramic, obtained through thermal crystallisation treatment of the glass.

Figure 6:
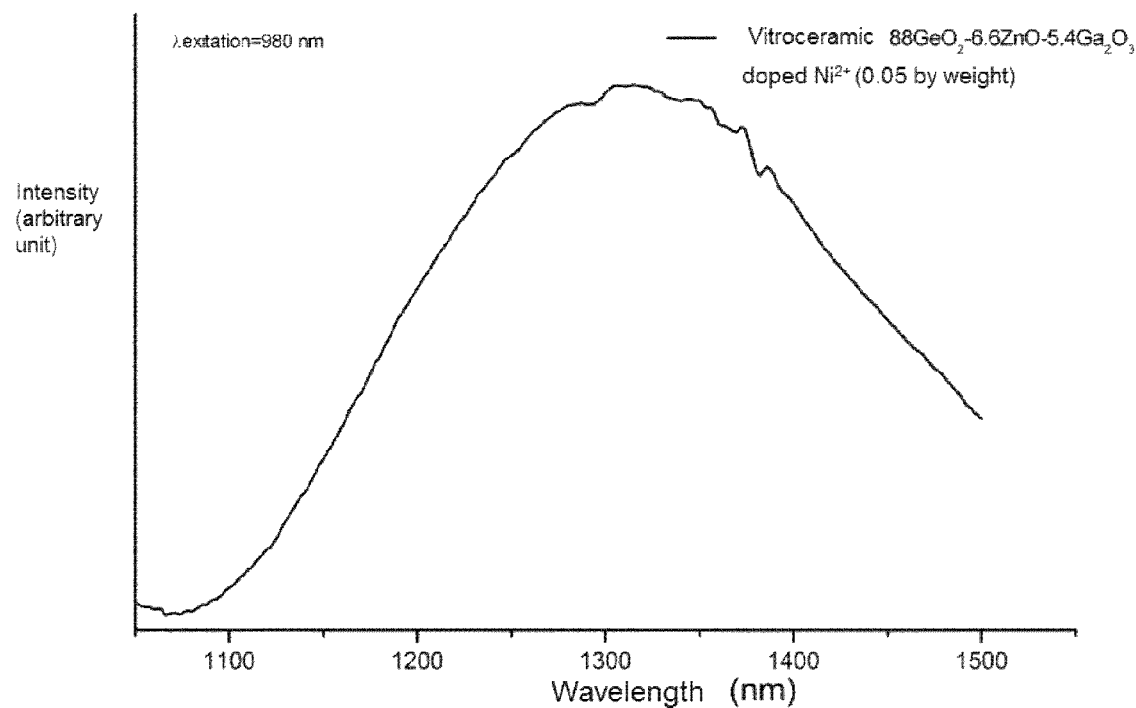

FIG. 6: Spectrum of photoluminscence in the infra-red ($\lambda_{excitation}$=980 nm) of a nanostructured vitroceramic of the composition: $88GeO_2$-$5.4Ga_2O_3$-$6.6ZnO$, doped with nickel ($Ni^{2+}$, 0.05 by weight). The x-coordinate axis depicts wavelengths in nm, while the y-coordinate axis depicts intensity, expressed as an arbitrary unit.

Figure 7:
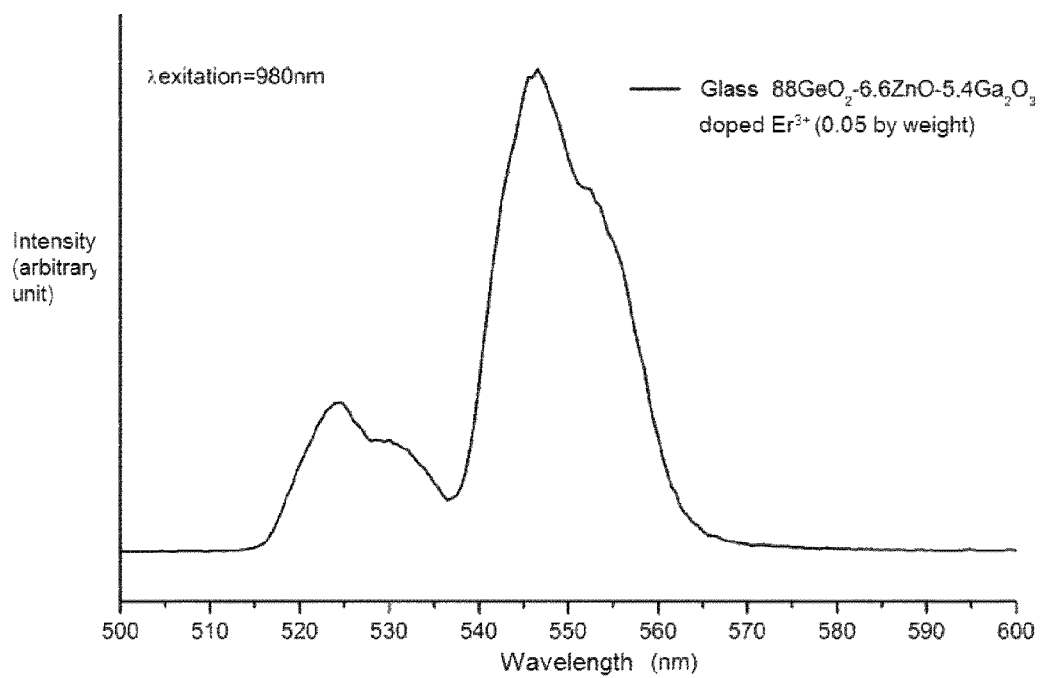

FIG. 7: Spectrum of conversion photoluminscence at a wavelength that is shorter than that of the emission ("up-conversion"), for $\lambda_{excitation}$=980 nm of a nanostructured glass of the composition $88GeO_2$-$5.4Ga_2O_3$-$6.6ZnO$, doped with 0.5 per unit mass of erbium ($Er^{3+}$). The x-coordinate axis depicts wavelengths in nm, while the y-coordinate axis depicts intensity, expressed as an arbitrary unit.

Figure 8:
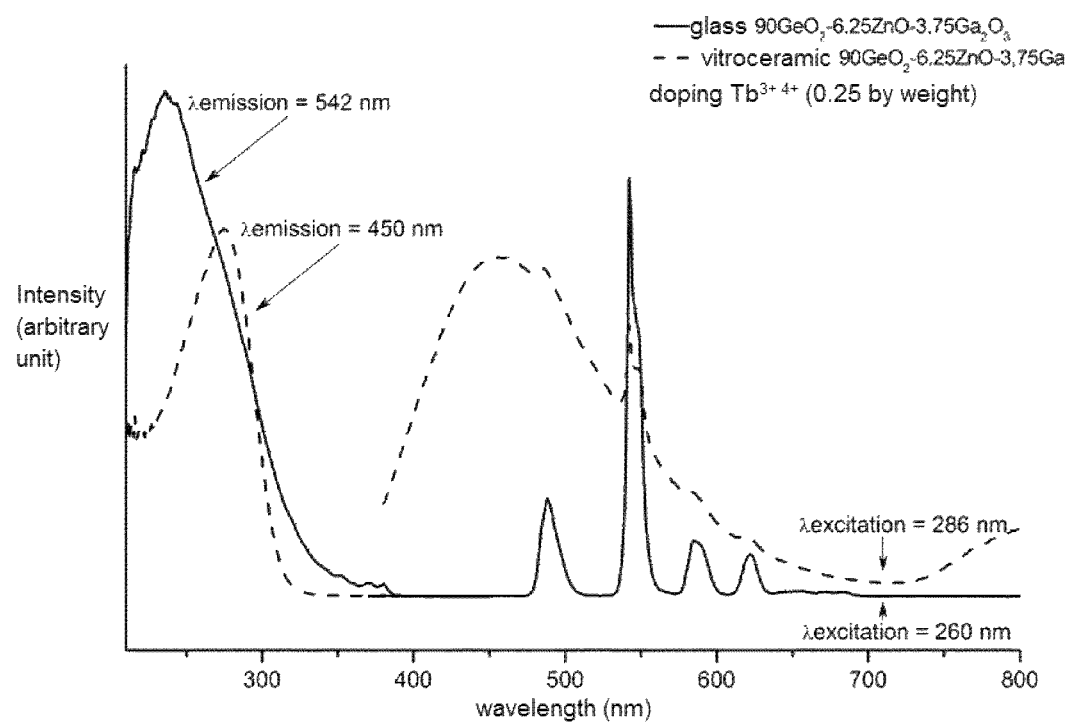

FIG. 8: Spectrum of excitation (On the left) and emission spectrum (at right) of a vitroceramic and a glass of nanostructured germanate of composition $90GeO_2$-$6.25ZnO$-$3.75Ga_2O_3$, doped with terbium ($Tb^{3+}/Tb^{4+}$, 0.25 by weight). The x-coordinate axis depicts wavelengths in nm, while the y-coordinate axis depicts intensity, expressed as an arbitrary unit. In the case of the glass, the excitation spectrum corresponds to the emission as measured at 542 nm, while the emission spectrum corresponds to excitation at a wavelength of 260 nm. In the case of the vitroceramic, the excitation spectrum corresponds to the emission as measured at 450 nm, while the emission spectrum corresponds to excitation at a wavelength of 286 nm. The excitation curve of the glass (solid line) shows a maximum for around $\lambda$=240 nm, whereas the excitation curve for the vitroceramic (stippled line) shows a maximum for around $\lambda$=280 nm. The emission curve for the glass (solid line) shows four slight peaks, with an intense peak at around 550 nm. The vitroceramic's emission curve (stippled line) shows a broad peak, including a gentle "shoulder" towards 550 nm.

Figure 9:
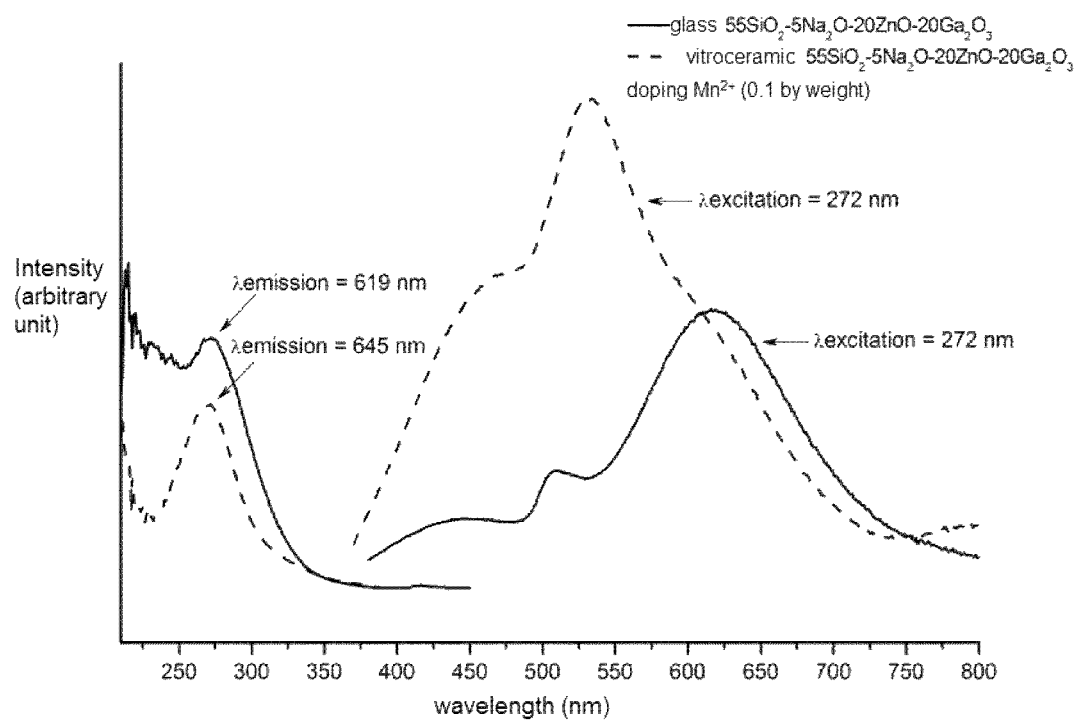

FIG. 9: Spectrum of excitation (On the left) and spectrum of emission (at right) of a nanostructured silicate vitroceramic and glass with the identical composition, doped with manganese. ($Mn^{2+}$, 0.1 by weight). The x-coordinate axis depicts wavelengths in nm, while the y-coordinate axis depicts intensity, expressed as an arbitrary unit. In the case of the glass, the excitation spectrum corresponds to the emission as measured at 619 nm, while the emission spectrum corresponds to excitation at a wavelength of 272 nm. In the case of the vitroceramic, the excitation spectrum corresponds to the emission as measured at 645 nm, while the emission spectrum corresponds to excitation at a wavelength of 272 nm. The excitation curve for the glass (solid line) shows a maximum for around $\lambda$=275 nm with high intensity, whereas the excitation for the vitroceramic (stippled line) shows a maximum for around $\lambda$=270 nm, with a lower intensity than that of the glass. The emission curve of the glass (solid line) shows broad peaks, with a maximum intensity at around $\lambda$=625 nm, which is below that of the vitroceramic (the signal of the glass is less intense than that of the vitroceramic). The vitroceramic's emission curve (stippled line) also shows broad peaks, with a maximum intensity for around $\lambda$=530 nm.

EXAMPLES

The following examples are intended to illustrate the invention in greater detail, but are by no means exhaustive. In particular, the methods to be described below are the laboratory procedures, which can readily be adapted to an industrial scale by those skilled in the art.

Powders of oxide precursors are first weighed out in the desired proportions, and then ground and mixed into a mortar. Where carbonates are used, a decarbonisation step is carried out. The glasses and vitroceramics are then synthesised from the mixtures prepared as already described, by melting in a conventional oven (fitted with heating resistors) at a temperature within the range between 900° C. and 1700° C., followed by cooling of the liquid. Temperatures of vitreous production decrease with the increase in germanium oxide content. In the case of vitroceramics, a thermal crystallisation treatment is then carried out in a conventional laboratory oven at a temperature within the range between 400° C. and 900° C.

Example of Laboratory Production of a Glass and its Equivalent Vitroceramic, Adapted for Implementation on an Industrial Scale.

Glass Production Method

In order to prepare 2 g glass of the molar composition $78.04GeO_2$-$9.76ZnO$-$9.76Ga_2O_3$-$2.44Na_2O$, the following weighing operations are carried out:

1.4927 g $GeO_2$
0.1452 g ZnO
0.3344 g $Ga_2O_3$
0.0493 g $Na_2CO_3$.

After weighing out individually, the complete set of precursors is ground and mixed thoroughly into an agate mortar. The mixture is then placed in a platinum crucible.

In view of the presence of sodium carbonate, the mixture then undergoes decarbonisation treatment (gradual heating (10° C./min.) to 900° C. and held at that temperature for 6 hours, then chilled in the oven, (which has been shut down)

in order to eliminate the $CO_2$ present in the sodium carbonate, thereby making it possible to obtain the sodium oxide of the composition.

After the decarbonisation treatment (which is applied only where there is carbonate in the mixture of precursors), the platinum crucible is placed in a hot muffle furnace at 1300° C. and heated for 30 minutes. On completion of heating, the mixture cast is removed from the oven and chilled in the crucible (chilled atmospherically).

In this way we obtain a glass according to the invention, of the formula $78.04GeO_2\text{-}9.76ZnO\text{-}9.76Ga_2O_3\text{-}2.44Na_2O$.

Method of Vitroceramic Production

The glass, synthesised as already shown, then undergoes thermal crystallisation treatment in a tubular oven (for 3 hours at 615° C.), which will produce a transparent nanostructured vitroceramic.

Implementation on an Industrial Scale

In the case of an industrial method, some steps can be amended to take account of energy-consumption considerations. For example, the decarbonisation phase could be merged directly into the heating phase (one step). Conventional refining additives, familiar in the field, may be also be added to facilitate fusion of the glass and the elimination of bubbles. On the other hand, the annealing of crystallisation could be done while cooling the glass, for example directly in a mould containing the ground glass (mould kept for 3 hours in an oven at 615° C.).

Transmission of glasses and vitroceramics was measured in the 250 nm-8000 nm spectral domain, using a dual-beam spectrophotometer.

Glasses and vitroceramics were synthesised using a similar method, corresponding to the compositions of formula (I):

$$(GeO_2)_x(SiO_2)_y(B_2O_3)_z(Ga_2O_3)_a(Oxy_1)_b(Oxy_2)_k \qquad (I),$$

in which:

| | x | y | z | A | b (Oxy 1) | k (Oxy2) |
|---|---|---|---|---|---|---|
| Germanate | | | | | | |
| $98GeO_2$—$0.75Ga_2O_3$—$1.25ZnO$ | 98 | 0 | 0 | 0.75 | 1.25 (ZnO) | 0 |
| $60GeO_2$—$3Na_2O$—$13.9Ga_2O_3$—$23.1ZnO$ | 60 | 0 | 0 | 13.9 | 23.1 (ZnO) | 3 (Na$_2$O) |
| $90GeO_2$—$3.75Ga_2O_3$—$6.25AgO$ | 90 | 0 | 0 | 3.75 | 6.25 (AgO) | 0 |
| $84GeO_2$—$6Ga_2O_3$—$10ZnO$ | 84 | 0 | 0 | 6 | 10 (ZnO) | 0 |
| $60GeO_2$—$3Na_2O$—$13.9Ga_2O_3$—$23.1MgO$ | 60 | 0 | 0 | 13.9 | 23.1 (MgO) | 3 (Na$_2$O) |
| $92GeO_2$—$2Ga_2O_3$—$6Bi_2O_3$ | 86.8 | 0 | 0 | 1.9 | 11.3 (BiO$_{1.5}$) | 0 |
| $87GeO_2$—$1K_2O$—$3Ga_2O_3$—$9WO_3$ | 87 | 0 | 0 | 3 | 9 (WO$_3$) | 1 (K$_2$O) |
| $90GeO_2$—$3.75Ga_2O_3$—$6.25ZnO$ | 90 | 0 | 0 | 3.75 | 6.25 (ZnO) | 0 |
| $90GeO_2$—$3.75Ga_2O_3$—$6.25Bi_2O_3$ | 84.7 | 0 | 0 | 3.5 | 11.8 (BiO$_{1.5}$) | 0 |
| $88GeO_2$—$5.4Ga_2O_3$—$6.6ZnO$ | 88 | 0 | 0 | 5.4 | 6.6 (ZnO) | 0 |
| $78.04GeO_2$—$9.76ZnO$—$9.76Ga_2O_3$—$2.44Na_2O$ | 78.04 | 0 | 0 | 9.76 | 9.76 (ZnO) | 2.44 Na$_2$O |

| | x | y | z | a | b (Oxy$_1$) | k (Oxy$_2$) |
|---|---|---|---|---|---|---|
| Silicate | | | | | | |
| $55SiO_2$—$5Na_2O$—$23Ga_2O_3$—$17ZnO$ | 0 | 55 | 0 | 23 | 17 (ZnO) | 5 (Na$_2$O) |
| $44SiO_2$—$6Na_2O$—$25Ga_2O_3$—$25\ MgO$ | 0 | 44 | 0 | 25 | 25 (MgO) | 6 (Na$_2$O) |
| $60SiO_2$—$5Na_2O$—$1K_2O$—$20Ga_2O_3$—$10ZnO$—$4Nb_2O_5$ | 0 | 57.8 | 0 | 19.2 | 17.3 (7.7 NbO$_{2.5}$, 9.6 ZnO) | 5.7 (4.8 Na$_2$O, 0.9K$_2$O) |
| $55SiO_2$—$5Na_2O$—$20Ga_2O_3$—$20ZnO$ | 0 | 55 | 0 | 20 | 20 (ZnO) | 0 |
| Silicogermanate | | | | | | |
| $42GeO_2$—$50SiO_2$—$3Ga_2O_3$—$5ZnO$ | 42 | 50 | 0 | 3 | 5 (ZnO) | 0 |
| $70GeO_2$—$10SiO_2$—$2Na_2O$—$4Ga_2O_3$—$4Bi_2O_3$ | 67.4 | 9.6 | 0 | 3.8 | 7.7 (BiO$_{1.5}$) | 1.9 (Na$_2$O) |
| $50GeO_2$—$30SiO_2$—$10B_2O_3$—$5Ga_2O_3$—$5ZnO$ | 50 | 30 | 10 | 5 | 5 (ZnO) | 0 |

Summary table of synthesised compositions.

Where appropriate, dopants were added to these compositions. Dopants were added during the manufacturing process for doped glasses and vitroceramics in powder form, then ground and mixed with other powders of precursors, as described above in the example of glass synthesis of the formula $78.04GeO_2\text{-}9.76ZnO\text{-}9.76Ga_2O_3\text{-}2.44Na_2O$.

Photographs of glasses and vitroceramics of (a) germanate ($78GeO_2\text{-}9.8ZnO\text{-}9.8Ga_2O_3\text{-}2.4Na_2O$), and (b) silicate ($55SiO_2\text{-}5Na_2O\text{-}23Ga_2O_3\text{-}17ZnO$) are shown in FIG. 1. These illustrate the transparency of the materials according to the invention.

In addition, FIG. 2 shows the negatives of electronic microscopy in transmission (MET) of a glass and vitroceramic of the composition: $84GeO_2\text{-}6Ga_2O_3\text{-}10ZnO$. The negative of glass reveals segregation of the nucleation/growth type, of nanometric size.

FIG. 3 shows the negatives of electronic microscopy in transmission (MET) of a nanostructured glass with spinel-phase separation, of the composition $80GeO_2\text{-}7.5Ga_2O_3\text{-}12.5ZnO$.

With regard to FIG. 4, it depicts compositions of a glass and vitroceramic of the composition: $55SiO_2\text{-}5Na_2O\text{-}20Ga_2O_3\text{-}20ZnO$ (negatives of electronic microscopy in transmission (MET). In this instance, the glass shows spinel-phase separation of nanometric size.

FIG. 5 shows negatives of electronic microscopy in transmission (MET) of a nanostructured glass with nucleation-growth phase separation, with nanostructuring of a very small size in the order of a few nm, and a vitroceramic of the composition $90GeO_2\text{-}3.75Ga_2O_3\text{-}6.25Bi_2O_3$.

FIG. 6 describes a spectrum of photoluminescence in the infra-red ($\lambda_{excitation}=980$ nm) of a nanostructured vitroceramic of the composition: $88GeO_2\text{-}5.4Ga_2O_3\text{-}6.6ZnO$, doped with nickel ($Ni^{2+}$, 0.05% by weight).

FIGS. 7 to 9 show spectra depicting the optical properties of glasses and vitroceramics of the composition: $88GeO_2\text{-}5.4Ga_2O_3\text{-}6.6ZnO$, doped with 0.5% per unit mass of erbium ($Er^{3+}$), $90GeO_2\text{-}6.25ZnO\text{-}3.75Ga_2O_3$, doped with terbium ($Tb^{3+}/Tb^{4+}$, 0.25% by weight), and $90GeO_2\text{-}6.25ZnO\text{-}3.75Ga_2O_3$, doped with manganese ($Mn^{2+}$, 0.1% by weight).

The invention claimed is:

1. A nanostructured vitroceramic, either transparent or translucent, with essentially zero $Li_2O$ content and zero $Al_2O_3$ content, containing 97% to 100% by weight in relation to the overall weight of the material, of a composition of the following formula I:

$$(GeO_2)_x(SiO_2)_y(B_2O_3)_z(Ga_2O_3)_a(Oxy_1)_b(Oxy_2)_k \quad (I)$$

where $Oxy_1$ is an oxide selected from among ZnO, MgO, $NbO_{2.5}$, $WO_3$, NiO, SnO, $TiO_2$, $BiO_{1.5}$, AgO, CaO, MnO, or a mixture thereof, and $Oxy_2$ is an oxide selected from $Na_2O$, $K_2O$, or a mixture thereof, and $0 \leq x \leq 98$, and $0 \leq y \leq 60$, and x and y are not simultaneously zero, and $0 \leq z \leq 20$, x, y, z are such that $40 \leq x+y+z \leq 98$, $0.1 \leq x \leq 50$, $0 \leq b \leq 35$, and $0 \leq k \leq 7$, and x, y, z, a, b and k are such that $x+y+z+a+b+k=100$.

2. Nanostructured glass, either transparent or translucent, with essentially zero $Li_2O$ content and zero $Al_2O_3$ content, containing 97% to 100% by weight in relation to the overall weight of the material, of a composition of the following formula I:

$$(GeO_2)_x(SiO_2)_y(B_2O_3)_z(Ga_2O_3)_a(Oxy_1)_b(Oxy_2)_k \quad (I)$$

where $Oxy_1$ is an oxide selected from among ZnO, MgO, $NbO_{2.5}$, $WO_3$, NiO, SnO, $TiO_2$, $BiO_{1.5}$, AgO, CaO, MnO, or a mixture thereof, and $Oxy_2$ is an oxide selected from among $Na_2O$, $K_2O$ or a mixture thereof, and $0 \leq x \leq 98$, and $0 \leq y \leq 60$, and x and y are not simultaneously zero, and $0 \leq z \leq 20$, x, y, z are such that $40 \leq x+y+z \leq 98$, $0.1 \leq x \leq 50$, $0 \leq b \leq 35$, and $0 \leq k \leq 7$, and x, y, z, a, b and k are such that $x+y+z+a+b+k=100$.

3. Vitroceramic according to claim 1, wherein x and y are such that $x+y \geq 40$, in particular $x+y \geq 50$.

4. Vitroceramic according to claim 1, wherein x is equal to 0 and $40 \leq y \leq 60$ or $43 \leq y \leq 55$.

5. Vitroceramic according to claim 1, wherein y is equal to 0 and $50 \leq x \leq 98$ and z is equal to 0.

6. Vitroceramic or glass according to claim 1, wherein x and y are each independently $-10 \leq x \leq 80$; and $-10 \leq y \leq 60$, and x and y are such $50 \leq x+y \leq 95$, $60 \leq x+y \leq 98$ or $80 \leq x+y \leq 95$.

7. Vitroceramic according to claim 1, containing dopants in addition to the composition formula (I) in order to attain 100% per unit mass.

8. Manufacturing process of a nanostructured glass according to claim 2, comprising the successive steps of:

1—melting of initial oxides, or if applicable precursors thereof, present in powder form, at a temperature within the range between 900° C. and 1700° C.;

2—cooling, producing a transparent or translucent nanostructured glass with essentially zero $Li_2O$ content and zero $Al_2O_3$ content, containing 97% to 100% by weight, in relation to the overall weight of the glass, of a composition of the following formula I:

$$(GeO_2)_x(SiO_2)_y(B_2O_3)_z(Ga_2O_3)_a(Oxy_1)_b(Oxy_2)_k \quad (I)$$

where $Oxy_1$ is an oxide selected from among ZnO, MgO, $NbO_{2.5}$, $WO_3$, NiO, SnO, $TiO_2$, $BiO_{1.5}$, AgO, CaO, MnO, or a mixture thereof, and $Oxy_2$ is an oxide selected from among $Na_2O$, $K_2O$ or a mixture thereof, and $0 \leq x \leq 98$, and $0 \leq y \leq 60$, and x and y are not simultaneously zero, and $0 \leq z \leq 20$, $40 \leq x+y+z \leq 98$, $0.1 \leq x \leq 50$, $0 \leq b \leq 35$, and $0 \leq k \leq 7$, and x, y, z, a, b and k are such that $x+y+z+a+b+k=100$.

9. Manufacturing process of a nanostructured vitroceramic according to claim 1, comprising the successive steps of:

1—manufacture of a transparent or translucent nanostructured glass with essentially zero $Li_2O$ content and zero $Al_2O_3$ content, and containing 97% to 100% by weight in relation to the overall weight of the material, of a composition of the following formula I:

$$(GeO_2)_x(SiO_2)_y(B_2O_3)_z(Ga_2O_3)_a(Oxy_1)_b(Oxy_2)_k \quad (I)$$

where

Oxy$_1$ is an oxide selected from among ZnO, MgO, NbO$_{2.5}$, WO$_3$, NiO, SnO, TiO$_2$, BiO$_{1.5}$, AgO, CaO, MnO, or a mixture thereof, and Oxy$_2$ is an oxide selected from Na$_2$O, K$_2$O or a mixture thereof, and $0 \leq x \leq 98$, and $0 \leq y \leq 60$, and x and y are not simultaneously zero, and $0 \leq z \leq 20$, $40 \leq x+y+z \leq 98$, $0.1 \leq x \leq 50$, $0 \leq b \leq 35$, and $0 \leq k \leq 7$, and x, y, z, a, b and k are such that $x+y+z+a+b+k=100$, according to a process comprising the successive steps of:

melting of the initial oxides, or if applicable their precursors, present in powder form, at a temperature within the range between 900° C. and 1700° C., and then cooling;

2—thermal crystallisation treatment of the glass at a temperature within the range between 400° C. and 900° C., for a period within the range between 15 minutes and 48 hours.

10. Use of a glass according to claim 2, for the manufacture of optical material, including masses, powders, fibres or layers;

for the manufacture of material for medical imaging, for lighting or for displays; or for laser marking.

11. The nanostructured vitroceramic of claim 1, containing 99% to 100% by weight in relation to the overall weight of the material, of a composition of the formula I.

12. The nanostructured vitroceramic of claim 1, wherein Oxy$_1$ is an oxide selected from ZnO, MgO, AgO, BiO$_{1.5}$, NbO$_{2.5}$, or a mixture thereof.

13. The nanostructured vitroceramic of claim 1, wherein Oxy$_2$ is Na$_2$O.

14. The nanostructured vitroceramic of claim 1, wherein $0 \leq z \leq 10$.

15. The nanostructured vitroceramic of claim 1, wherein $0.5 \leq a \leq 25$.

16. The nanostructured vitroceramic of claim 1, wherein $1 \leq b \leq 25$.

17. The nanostructured vitroceramic of claim 1, wherein $0 \leq k \leq 5$.

18. A nanostructured vitroceramic, either transparent or translucent, with essentially zero Li$_2$O content and zero Al$_2$O$_3$ content, containing 99% to 100% by weight in relation to the overall weight of the material, of a composition of the following formula I:

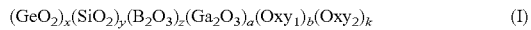

$$(GeO_2)_x(SiO_2)_y(B_2O_3)_z(Ga_2O_3)_a(Oxy_1)_b(Oxy_2)_k \quad (I)$$

where

Oxy$_1$ is an oxide selected from ZnO, MgO, AgO, BiO$_{1.5}$, NbO$_{2.5}$, or a mixture thereof, and Oxy$_2$ is Na$_2$O, and $0 \leq x \leq 98$, and $0 \leq y \leq 60$, and x and y are not simultaneously zero, and $0 \leq z \leq 10$, $40 \leq x+y+z \leq 98$, $0.5 \leq x \leq 25$, $1 \leq b \leq 25$, and $0 \leq k \leq 5$, and x, y, z, a, b and k are such that $x+y+z+a+b+k=100$.

19. The nanostructured glass of claim 2, containing 99% to 100% by weight in relation to the overall weight of the material, of a composition of the formula I.

20. The nanostructured glass of claim 2, wherein Oxy$_1$ is an oxide selected from ZnO, MgO, AgO, BiO$_{1.5}$, NbO$_{2.5}$, or a mixture thereof.

21. The nanostructured glass of claim 2, wherein Oxy$_2$ is Na$_2$O.

22. The nanostructured glass of claim 2, wherein $0 \leq z \leq 10$.

23. The nanostructured glass of claim 2, wherein $0.5 \leq a \leq 25$.

24. The nanostructured glass of claim 2, wherein $1 \leq b \leq 25$.

25. The nanostructured glass of claim 2, wherein $0 \leq k \leq 5$.

26. Nanostructured glass, either transparent or translucent, with essentially zero Li$_2$O content and zero Al$_2$O content, containing 99% to 100% by weight in relation to the overall weight of the material, of a composition of the following formula I:

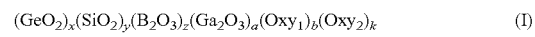

$$(GeO_2)_x(SiO_2)_y(B_2O_3)_z(Ga_2O_3)_a(Oxy_1)_b(Oxy_2)_k \quad (I)$$

where

Oxy$_1$ is an oxide selected preferably from ZnO, MgO, AgO, BiO$_{1.5}$, NbO$_{2.5}$, or a mixture thereof, and Oxy$_2$ is Na$_2$O, and $0 \leq x \leq 98$, and $0 \leq y \leq 60$, and x and y are not simultaneously zero, and $0 \leq z \leq 10$, x, y, z are such that $40 \leq x+y+z \leq 98$, $0.5 \leq x \leq 25$, $1 \leq b \leq 25$, and $0 \leq k \leq 5$, and x, y, z, a, b and k are such that $x+y+z+a+b+k=100$.

27. Manufacturing process of a nanostructured glass according to claim 26, comprising the successive steps of:

1—melting of initial oxides, or if applicable precursors thereof, present in powder form, at a temperature within the range between 900° C. and 1700° C.;

2—cooling, producing a transparent or translucent nanostructured glass with essentially zero Li$_2$O content and zero Al$_2$O$_3$ content, containing 99% to 100% by weight, in relation to the overall weight of the glass, of a composition of the following formula I:

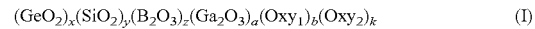

$$(GeO_2)_x(SiO_2)_y(B_2O_3)_z(Ga_2O_3)_a(Oxy_1)_b(Oxy_2)_k \quad (I)$$

where

Oxy$_1$ is an oxide selected from among ZnO, MgO, AgO, BiO$_{1.5}$, NbO$_{2.5}$, or a mixture thereof, and Oxy$_2$ is Na$_2$O, and $0 \leq x \leq 98$, and $0 \leq y \leq 60$, and x and y are not simultaneously zero, and $0 \leq z \leq 10$, x, y, z are such that $40 \leq x+y+z \leq 98$, $0.5 \leq x \leq 25$, $1 \leq b \leq 25$, and $0 \leq k \leq 5$, and x, y, z, a, b and k are such that $x+y+z+a+b+k=100$.

28. The process according to claim 9, wherein the thermal crystallisation treatment is performed at a temperature within the range 600° C. and 800° C., for a period within the range between 15 minutes and 6 hours.

29. Manufacturing process of a nanostructured vitroceramic according to claim 1, comprising the successive steps of:

1—manufacture of a transparent or translucent nanostructured glass with essentially zero $Li_2O$ content and zero $Al_2O_3$ content, and containing 99% to 100% by weight in relation to the overall weight of the material, of a composition of the following formula I:

$$(GeO_2)_x(SiO_2)_y(B_2O_3)_z(Ga_2O_3)_a(Oxy_1)_b(Oxy_2)_k \quad (I)$$

where $Oxy_1$ is an oxide selected from among ZnO, MgO, AgO, $BiO_{1.5}$, $NbO_{2.5}$, or a mixture thereof, and $Oxy_2$ is $Na_2O$, and $0 \leq x \leq 98$, and $0 \leq y \leq 60$, and x and y are not simultaneously zero, and $0 \leq z \leq 10$, x, y, z are such that $40 \leq x+y+z \leq 98$, $0.5 \leq x \leq 25$, $1 \leq b \leq 25$, and $0 \leq k \leq 5$, and x, y, z, a, b and k are such that $x+y+z+a+b+k=100$, according to a process comprising the successive steps of:

melting of the initial oxides, or if applicable their precursors, present in powder form, at a temperature within the range between 900° C. and 1700° C., and then cooling;

2—thermal crystallisation treatment of the glass at a temperature within the range between 600° C. and 800° C., for a period within the range between 15 minutes and 6 hours, and preferably between 30 minutes and 2 hours.

30. Glass according to claim 2, wherein x and y are such that $x+y \geq 40$, in particular $x+y \geq 50$.

31. Glass according to claim 2, wherein x is equal to 0 and $40 \leq y \leq 60$ or $43 \leq y \leq 55$.

32. Glass according to claim 2, wherein y is equal to 0 and $50 \leq x \leq 98$ and z is equal to 0.

33. Vitroceramic or glass according to claim 2, wherein x and y are each independently $-10 \leq x \leq 80$; and $-10 \leq y \leq 60$; and x and y are such that $50 \leq x+y \leq 95$, $60 \leq x+y \leq 98$ or $80 \leq x+y \leq 95$.

34. Glass according to claim 2, containing dopants in addition to the composition formula (I) in order to attain 100% per unit mass.

35. Use of a vitroceramic according to claim 1, for the manufacture of optical material, including masses, powders, fibres or layers;

for the manufacture of material for medical imaging, for lighting or for displays; or for laser marking.

* * * * *